US012592892B2

(12) United States Patent
Krishan

(10) Patent No.: US 12,592,892 B2
(45) Date of Patent: Mar. 31, 2026

(54) METHODS, SYSTEMS, AND COMPUTER READABLE MEDIA FOR ADJUSTING AND USING PRIORITIES OF SERVICE/NOTIFICATION REQUEST MESSAGES AT NETWORK FUNCTIONS WITH MULTIPLE SLICE SUPPORT

(71) Applicant: Oracle International Corporation, Redwood Shores, CA (US)

(72) Inventor: Rajiv Krishan, Cary, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 244 days.

(21) Appl. No.: 17/960,800

(22) Filed: Oct. 5, 2022

(65) Prior Publication Data

US 2024/0121199 A1 Apr. 11, 2024

(51) Int. Cl.
*H04L 47/11* (2022.01)
*H04L 47/24* (2022.01)

(52) U.S. Cl.
CPC .......... *H04L 47/2458* (2013.01); *H04L 47/11* (2013.01)

(58) Field of Classification Search
CPC .............................. H04L 47/2458; H04L 47/11
USPC ........................................................ 709/224
See application file for complete search history.

(56) References Cited

U.S. PATENT DOCUMENTS

| | | | |
|---|---|---|---|
| 10,609,530 | B1 | 3/2020 | Patil et al. |
| 10,616,802 | B2 | 4/2020 | Krishan et al. |
| 10,833,938 | B1 * | 11/2020 | Rajput ................ H04L 67/1095 |
| 11,622,293 | B2 | 4/2023 | Gupta et al. |
| 12,177,720 | B2 | 12/2024 | Krishan |
| 2012/0013748 | A1 * | 1/2012 | Stanwood ........... H04L 47/2408 |
| | | | 348/192 |
| 2016/0007170 | A1 | 1/2016 | Vaidya et al. |

(Continued)

FOREIGN PATENT DOCUMENTS

| | | |
|---|---|---|
| EP | 3496447 B1 | 3/2024 |
| EP | 4356588 A1 | 4/2024 |

(Continued)

OTHER PUBLICATIONS

Notice of Allowance for U.S. Appl. No. 17/685,159, filed Aug. 15, 2024.

(Continued)

*Primary Examiner* — Karen C Tang
(74) *Attorney, Agent, or Firm* — Jenkins, Taylor & Hunt, P.A.

(57) ABSTRACT

A method for adjusting priorities of messages at a network function (NF) with multiple network slice support includes, at a first NF that supports multiple network slices, storing a database of rules specifying network-slice-based priority adjustment parameters. The method further includes receiving a message from a second NF. The method further includes determining that a congestion or overload condition exists, and, in response. determining network slice information associated with the message, determining, using the network slice information and the database of network-slice-based priority adjustment parameters, a network-slice-adjusted priority value for the message, and discarding or processing the message based on the network-slice-adjusted priority value for the message.

14 Claims, 9 Drawing Sheets

(56) References Cited

U.S. PATENT DOCUMENTS

| | | | |
|---|---|---|---|
| 2018/0234291 A1 | 8/2018 | Mathison et al. | |
| 2018/0324671 A1 | 11/2018 | Palnati et al. | |
| 2019/0069235 A1 | 2/2019 | Patil et al. | |
| 2020/0186411 A1* | 6/2020 | Ravichandran | H04L 41/0631 |
| 2021/0067480 A1* | 3/2021 | Goel | H04L 61/4511 |
| 2021/0385283 A1 | 12/2021 | Talebi Fard et al. | |
| 2021/0410059 A1 | 12/2021 | Talebi Fard et al. | |
| 2022/0094740 A1 | 3/2022 | Saride | |
| 2022/0330085 A1* | 10/2022 | Li | H04L 67/565 |
| 2022/0400401 A1 | 12/2022 | Gupta et al. | |
| 2023/0146433 A1 | 5/2023 | Sharma et al. | |
| 2023/0284081 A1* | 9/2023 | Krishan | H04W 28/0289 370/329 |
| 2024/0137290 A1* | 4/2024 | Alvarez Dominguez | H04L 41/5009 |

FOREIGN PATENT DOCUMENTS

| | | |
|---|---|---|
| JP | 2020-536434 A | 12/2020 |
| JP | 7674530 B | 4/2025 |
| KR | 20220005936 A | 1/2022 |
| WO | WO 2017/143047 A1 | 8/2017 |
| WO | WO 2018/141945 A1 | 8/2018 |
| WO | WO 2020/109853 A1 | 6/2020 |
| WO | WO 2022/265853 A1 | 12/2022 |

OTHER PUBLICATIONS

Notice of Allowance and Fee(s) Due for U.S. Appl. No. 17/348,389 (Nov. 18, 2022).

Notification of Transmittal of the International Search Report and the Written Opinion of the International Searching Authority, or the Declaration for International Application No. PCT/US2022/031572 (Sep. 8, 2022).

"Ultra Cloud Core 5G Session Management Function, Release 2021.01—Configuration and Administration Guide," Cisco, pp. 1-13 (May 13, 2021).

"3rd Generation Partnership Project; Technical Specification Group Core Network and Terminals; 5G System; Technical Realization of Service Based Architecture; Stage 3 (Release 16)," 3GPP TS 29.500, V16.7.0), pp. 1-91, (Mar. 2021).

"3rd Generation Partnership Project; Technical Specification Group Services and System Aspects; System Architecture for the 5G System (5GS); Stage 2 (Release 17)," 3GPP TS 23.501, V17.0.0, pp. 1-489 (Mar. 2021).

"3rd Generation Partnership Project; Technical Specification Group Services and System Aspects; Procedures for the 5G System (5GS); Stage 2 (Release 17)," 3GPP TS 23.502, V17.0.0, pp. 1-646 (Mar. 2021).

"3rd Generation Partnership Project; Technical Specification Group Core Network and Terminals; Network Slice Selection Services; Stage 3 (Release 17)," 3GPP TS 29.531, V17.0.0, pp. 1-77 (Mar. 2021).

"3rd Generation Partnership Project; Technical Specification Group Services and System Aspects; Telecommunication management;

Study on management and orchestration of network slicing for Next Generation Network; (Release 15)," 3GPP TS 28.801, V15.1.0, pp. 1-75 (Jan. 2018).

"3rd Generation Partnership Project; Technical Specification Group Services and System Aspects; Management and Orchestration; Provisioning; (Release 16)," 3GPP TS 28.531, V16.9.0, pp. 1-73 (Mar. 2021).

"3rd Generation Partnership Project; Technical Specification Group Core Network and Terminals; 5G System; Network Function Repository Services; Stage 3 (Release 17)," 3GPP TS 29.510, V17.4.0, pp. 1-284 (Dec. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

"3rd Generation Partnership Project; Technical Specification Group Services and System Aspects; Architecture enhancements to facilitate communications with packet data networks and applications (Release 16)," 3GPP TS 23.682, V16.10.0, pp. 1-135 (Sep. 2021).

"3rd Generation Partnership Project; Technical Specification Group Core Network and Terminals; 5G System; Network Exposure Function Northbound APIs; Stage 3 (Release 16)," 3GPP TS 29.522, V16.9.0, pp. 1-185 (Sep. 2021).

"3rd Generation Partnership Project; Technical Specification Group Core Network and Terminals; T8 reference point for Northbound APIs; (Release 16)," 3GPP TS 29.122, V16.11.0, pp. 1-408 (Sep. 2021).

"3rd Generation Partnership Project; Technical Specification Group Core Network and Terminals; 5G System; Network Function Repository Services; Stage 3 (Release 17)," 3GPP TS 29.510 V17.6.0, pp. 1-306 (Jun. 2022).

"3rd Generation Partnership Project; Technical Specification Group Core Network and Terminals; 5G System Session Management Policy Control Service; Stage 3; (Release 17)," 3GPP TS 29.512 V17.7.0, pp. 1-255 (Jun. 2022).

Commonly-assigned, Co-pending U.S. Appl. No. 17/348,389 for "Methods, Systems, and Computer Readable Media for Establishing Message Priority in Network Slices Based on Quality of SE," (Unpublished, filed Jun. 16, 2021).

Commonly-assigned, Co-pending U.S. Appl. No. 17/685,159 for "Methods, Systems, and Computer Readable Media for Notification Delivery," (Unpublished, filed Mar. 2, 2022).

Notice of Allowance and Fee(s) Due for U.S. Appl. No. 16/121,203, filed Nov. 18, 2019.

"3rd Generation Partnership Project; Technical Specification Group Services and System Aspects; Architecture enhancements to facilitate communications with packet data networks and applications (Release 15)," 3GPP TS 23.682. V15.5.0. pp. 1-125 (Jun. 2018).

Non-Final Office Action for U.S. Appl. No. 17/685,159, filed Apr. 24, 2024.

Office Action for Japanese Patent Application Serial No. 2023577461 (Dec. 24, 2024).

Decision to Grant for Japanese Patent Application No. 2023577461 (Apr. 1, 2025).

First Examination Report for Indian Patent Application Serial No. 202347076518 (Sep. 16, 2025).

Communication pursuant to Article 94(3) for European Application No. 22738779.2 (Oct. 7, 2025).

* cited by examiner

METHODS, SYSTEMS, AND COMPUTER READABLE MEDIA FOR ADJUSTING AND USING PRIORITIES OF SERVICE/NOTIFICATION REQUEST MESSAGES AT NETWORK FUNCTIONS WITH MULTIPLE SLICE SUPPORT

TECHNICAL FIELD

The subject matter described herein relates to prioritizing processing of messages at a network function. More particularly, the subject matter described herein relates to methods, systems, and computer readable media for adjusting and using priorities of service/notification request messages at network functions (NFs) with multiple slice support.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other types of networks is the lack of a flexible and consistent mechanism for prioritizing messages relating to different network slices at a producer NF. For example, a producer NF may support (i.e., provide service to messages relating to) multiple network slices. A producer NF may also define a priority discard rule that specifies that during congestion, the producer NF may discard messages with priorities above a certain priority value. Consumer NFs set priorities in request messages that the consumer NFs send to the producer NF by setting the value of a 3GPP-Sbi-Message-Priority attribute in the messages. When the producer NF receives a message, the producer NF reads the 3GPP-Sbi-Message-Priority value from the message and, during congestion or overload, discards messages having priorities over a threshold value. Producer NFs may also set priorities in notification request messages sent to consumer NFs that support multiple network slices.

One problem with this priority mechanism occurs when consumer NFs set priorities based on their local policies. For example, if a consumer NF is shared for multiple network slices, the consumer NF may set different priorities for requests in different slices from different priority ranges. If the consumer NF is dedicated for a network slice, the consumer NF may use the complete range of priorities when sending requests to producer NFs. Hence, it may be difficult for the producer NF to determine if the consumer NF has adjusted the priority of requests for a network slice or if the consumer NF has used the full range of 0-31 priority. In the absence of such information, it becomes difficult for the producer NF to determine the actual priority of a request and hence makes it difficult to set message discard policy during overload/congestion.

Another problematic case is as follows. A consumer NF 1 is dedicated to slice A, and a consumer NF 2 is dedicated to slice B. Consumer NFs 1 and 2 may be configured to set priority from a range (based on the slice that each consumer NF manages). If the network operator needs to introduce consumer NF 3 for slice C, the introduction of consumer NF 3 may require consumer NF 1 and consumer NF 2 to adjust their priority ranges to accommodate the priority range for consumer NF 3. Thus, introducing new consumer NFs and/or slices becomes difficult for the network operator.

Another problematic case occurs when consumer NF 1 can select producer NF 1, which is dedicated for slice "A", or the consumer NF can select producer NF 2, which is shared for slice "A" and slice "B". In this case, setting the right priority of messages is challenging for the consumer NF when shared producer messages for slice "A" may be of lower priority than messages for slice "B". Thus, it becomes consumer NF's responsibility to set the right priority when sending a request so that the producer NF can handle the message correctly during an overload condition of the producer NF. This makes 5G deployment challenging where exclusive consumer NFs try to use shared and dedicated producer NFs for a given service.

In cases where a network operator desires to assign different priorities to messages associated with different network slices, not all messages contain network slice identifying information, so a priority scheme that relies on network slice information being carried in the messages would fail. For example, network slice information is mandatory in initial request messages. However, for subsequent requests, network slice information is not mandatory, and thus a producer NF may not be able to identify the network slice with which as subsequent request is associated to set the appropriate message priority.

In light of these and other difficulties, there exists a need for improved methods, systems, and computer readable media for adjusting and using priorities at a network function that supports multiple network slices.

SUMMARY

A method for adjusting and using priorities of messages at a network function (NF) with multiple network slice support includes, at a first NF that supports multiple network slices, storing a database of network-slice-based priority adjustment rules specifying network-slice-based priority adjustment parameters. The method further includes receiving a message from a second NF. The method further includes determining that a congestion or overload condition exists, and, in response. determining network slice information associated with the message, determining, using the network slice information and the database of network-slice-based priority adjustment rules, a network-slice-adjusted priority value for the message, and discarding or processing the message based on the network-slice-adjusted priority value for the message.

According to another aspect of the subject matter described herein, storing the database of network-slice-based message priority adjustment rules includes storing, on a per-interface basis, rules that specify ranges of priority values for the network slices.

According to another aspect of the subject matter described herein, storing the rules that specify ranges on a per-interface basis includes storing a first rule specifying first range of network-slice-adjusted priority values for a first network slice and interface and storing a second rule specifying a second range of network-slice-adjusted priority values for a second network slice and the interface, where the first range of network-slice-adjusted priority values is different from the second range of network-slice-adjusted priority values.

According to another aspect of the subject matter described herein, receiving the message includes receiving an initial service request and the method for adjusting and using the priorities of messages at an NF with multiple slice support includes reading a network slice identifier from the initial service request, generating a response to the initial service request, inserting the network slice identifier or a value that is mapped to the network slice identifier in a resource or association identifier, including the resource or association identifier in a location header of the response, and sending the response to the second NF.

According to another aspect of the subject matter described herein, receiving the message includes receiving a service request associated with an existing resource and wherein determining a network slice associated with the message includes reading a network slice identifier from a resource or association identifier of the service request.

According to another aspect of the subject matter described herein, receiving the message includes receiving a notification request and wherein determining a network slice associated with the message includes reading a network slice identifier from a notification uniform resource locator of the notification request.

According to another aspect of the subject matter described herein, determining the adjusted priority includes calculating an adjusted priority value using an equation that includes as a parameter a 3gpp-Sbi-Message-Priority value carried in the message or using a default priority value specified in an interface and network-slice based priority rule when the 3gpp-Sbi-Message-Priority value is not present in the message.

According to another aspect of the subject matter described herein, the equation includes as parameters minimum and maximum network-slice-adjusted priority values configured for a network slice associated with the message.

According to another aspect of the subject matter described herein, the equation comprises $$A=\text{floor}(R/31*(Mx-Mn))+Mn,$$

where A is the network-slice-adjusted adjusted priority value, R is the 3gpp-Sbi-Message-Priority value in the message, Mx is the maximum network-slice-adjusted priority value defined for the network slice, and Mn is the minimum network-slice-adjusted priority value defined for the network slice.

According to another aspect of the subject matter described herein, processing or discarding the message based on the network-slice-adjusted priority value includes determining that the network-slice-adjusted priority value is greater than a threshold, and, in response to determining that the network-slice-adjusted priority value is greater than the threshold, discarding the message.

According to another aspect of the subject matter described herein, a system for adjusting and using priorities of messages at a network function (NF) with multiple network slice support is provided. The system includes a first NF that supports multiple network slices, the first NF including at least one processor and a memory. The system further includes a network slice priority adjustment rules database embodied in the memory for storing rules specifying network-slice-based priority adjustment parameters. The system further includes a network-slice-adjusted priority determiner/message throttler implemented by the at least one processor for receiving a message from a second NF, determining that a congestion or overload condition exists, and, in response, determining network slice information associated with the message, determining, using the network slice information and the network slice priority adjustment rules database, a network-slice-adjusted priority for the message, and discarding or processing the message based on the network-slice-adjusted priority for the message.

According to another aspect of the subject matter described herein, the network slice priority adjustment rules database stores, on a per-interface basis, rules specifying ranges of priority values for the network slices, wherein storing the rules specifying ranges on a per-interface basis includes storing a first rule specifying first range of network-slice-adjusted priority values for a first network slice and interface and storing second rule specifying a second range of network-slice-adjusted priority values for a second network slice and the interface, where the first range of priority values is different from the second range of priority values.

According to another aspect of the subject matter described herein, the message includes an initial service request and wherein the network-slice-adjusted priority determiner/message throttler is configured to read a network slice identifier from the initial service request, generate a response to the initial service request, insert the network slice identifier or a value that is mapped to the network slice identifier in a resource or association identifier, include the resource or association identifier in a location header of the response, and send the response to the second NF.

According to another aspect of the subject matter described herein, the message includes a service request associated with an existing resource and wherein the network-slice-adjusted priority determiner/message throttler is configured to determine a network slice associated with the message by reading a network slice identifier from a resource or association identifier of the service request.

According to another aspect of the subject matter described herein, the message includes a notification request and wherein the network-slice-adjusted priority determiner/message throttler is configured to determine a network slice associated with the message by reading a network slice identifier from a notification uniform resource locator of the notification request.

According to another aspect of the subject matter described herein, the network-slice-adjusted priority determiner/message throttler is configured determine the adjusted priority by calculating an adjusted priority value using an equation that includes as a parameter a 3gpp-Sbi-Message-Priority value carried in the message or using a default priority value specified in an interface and network slice based priority rule when the 3gpp-Sbi-Message-Priority value is not present in the message.

According to another aspect of the subject matter described herein, the network-slice-adjusted priority determiner/message throttler is configured to discard the message in response to determining that the network-slice-adjusted priority value is greater than a threshold.

According to another aspect of the subject matter described herein, a non-transitory computer readable medium having stored thereon executable instructions that when executed by a processor of a computer control the computer to perform steps is provided. The steps are performed at a first network function (NF) that supports multiple network slices. The steps include storing a database of network-slice-based priority adjustment rules specifying network-slice-based priority adjustment parameters. The steps further include receiving a message from a second NF. The steps further include determining that a congestion or overload condition exists, and, in response: determining network slice information associated with the message; determining, using the network slice information and the database of network-slice-based priority adjustment rules, a network-slice-adjusted priority value for the message; and discarding or processing the message based on the network-slice-adjusted priority for the message.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
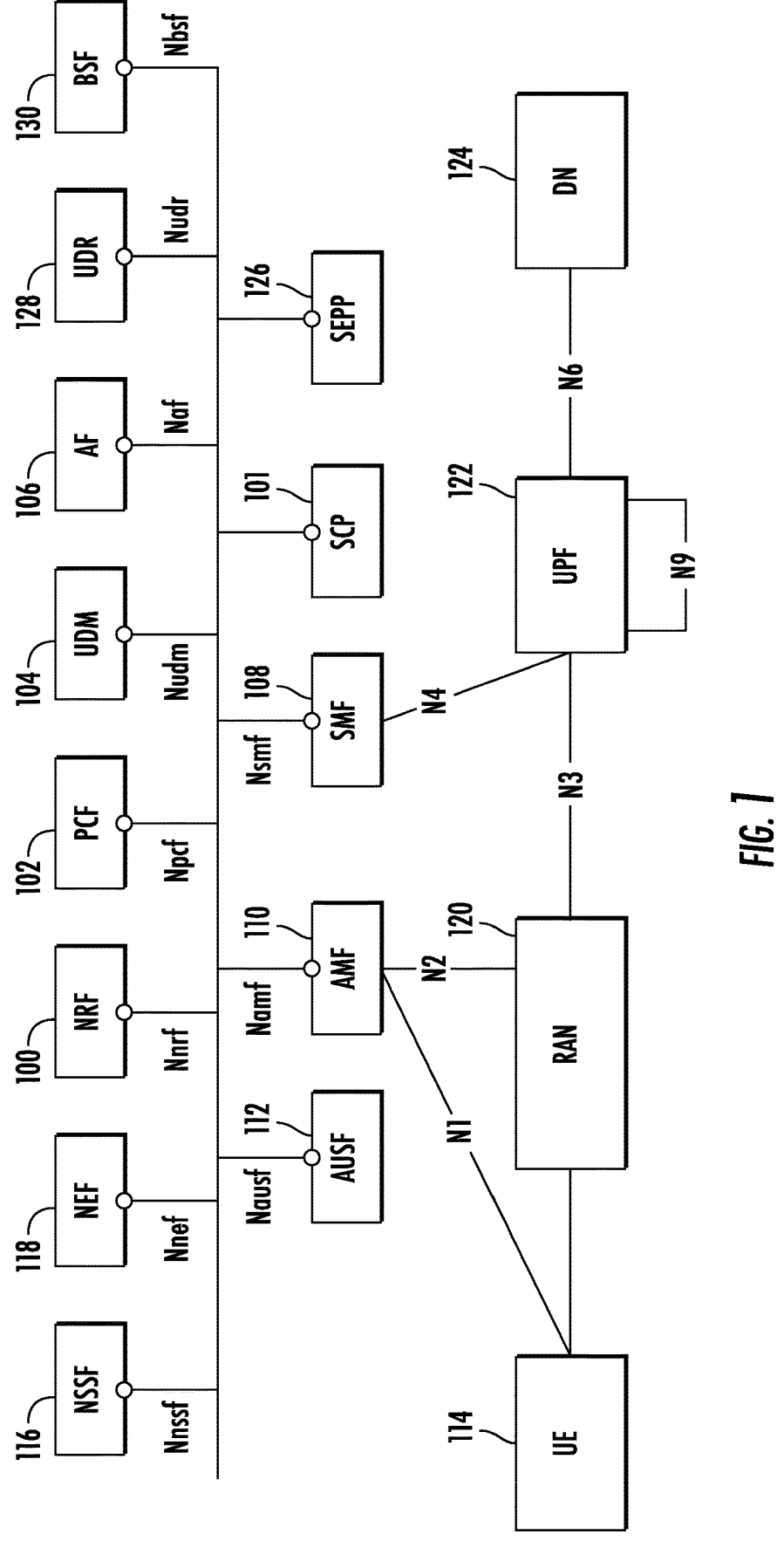
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

As stated above, one problem in 5G and other types of networks in which NFs support multiple network slices is the inability for the NFs to determine and use network-slice-adjusted priorities during overload and congestion events. With the network slicing concept, a network operator has the choice to deploy a given 5G node as a dedicated node for an exclusive network slice or a shared node across multiple network slices. This may lead to cases where shared slices will act as producers and receive traffic from dedicated slice nodes.

Figure 2:
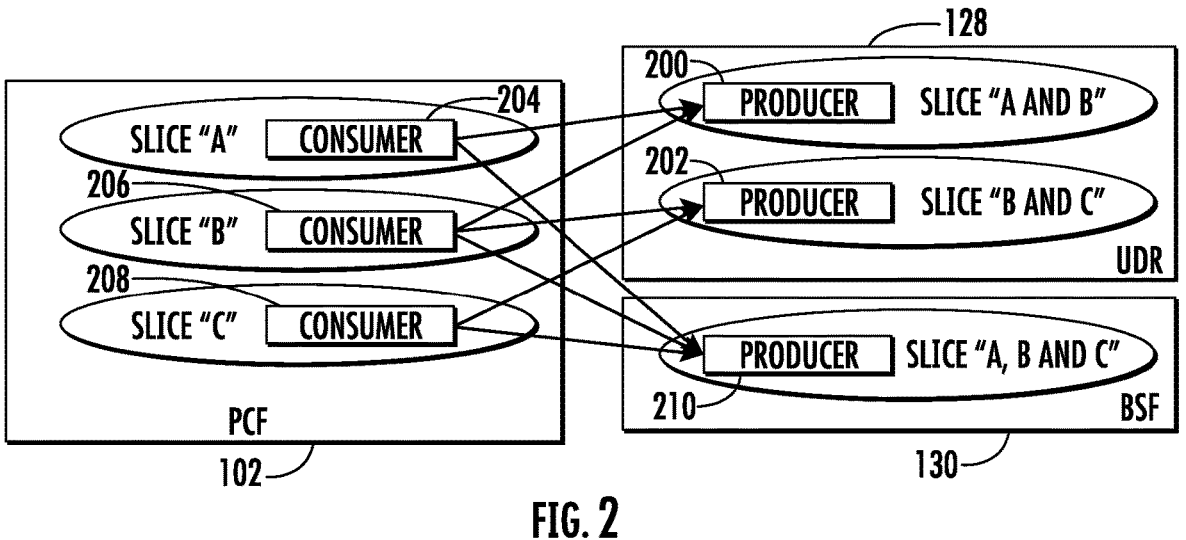
FIG. 2 is a block diagram illustrating NF deployment scenarios where a producer NF provides network slice services to consumer NFs.

FIG. 2 is a block diagram illustrating NF deployment scenarios where a producer NF provides services to consumer NFs using network slices. In FIG. 2, UDR 128 includes two producer NF instances 200 and 202. Producer NF instance 200 provides dedicated service to slice A consumer 204 and slice B consumer 206 of PCF 102. Producer NF instance 202 provides dedicated service to slice B consumer 206 and slice C consumer 208 of PCF 102. BSF 130 includes a single producer NF instance 210 that provides service to slice A consumer 204, slice B consumer 206, and slice C consumer 208 of PCF 102.

Service requests from NF service consumers may each have a message priority that can be used by an NF service producer to decide on message handling during overload of the NF service producer. However, if messages for different slices have the same priority, then they will have similar treatment at shared nodes. In FIG. 2, producer NF instance 200 will provide the same treatment to messages from slice A consumer 204 and slice B consumer 206. Producer NF instance 202 will provide the same treatment to messages from slice B consumer 206 and slice C consumer 208. Similarly, producer NF instance 210 will provide the same treatment for messages from slice A consumer 204, slice B consumer 206, and slice C consumer 208. Such a scheme may be undesirable because the producer NF may not know whether each consumer NF has set its message priorities using the entire range of priorities or using an adjusted range based on other consumer NFs and/or network slices.

The industry solution to the prioritization problem is for the network operator to establish priority rules and for the consumer NF to set message priorities based on the priority rules. In such a scheme, the same message from different slices can have different priorities (depending on how the consumer NFs set the priorities in the messages) and hence receive different treatment at the producer NF during congestion.

Challenges in this model include consumers from different vendors setting message priorities differently. It may be desirable to send different ranges of priorities for different network slices. However, it is possible that not all vendors support range-based priority assignment for different slices.

Another challenge is configuration complexity. For a given low priority slice, assume a network operator wishes to choose 20-30 as a priority range. Dedicated producers (for that slice) may have their discard rules set up to reject messages for that priority range at different load levels. For example, the producer NF may be configured to reject messages with priority >28 at L1 overload level and to reject messages with priority >25 at L2 overload level. With increase in number of priority ranges for different network slices, producer NFs require discard policies for each priority range. Configuring such rules at the producer can be complex, and processing messages from different network slices increases the complexity of configuration.

Range-based priority assignment for consumer NFs becomes further challenging when the network operator needs to introduce a new slice. Every time a new slice is being set up, all dedicated consumer NFs require re-configuration to set the correct priority towards shared producer NFs.

The challenges discussed above are also applicable for notification flows from producer to consumer, where the producer can be dedicated, but the consumer is shared for multiple slices. Thus, there is a need to simplify the procedure for handling the priority of different messages from different slices on dedicated and shared producer NFs.

The subject matter described herein includes an NF that identifies network slices associated with different message types and inserts network slice identifiers in message parameters so that subsequent messages relating to the same network slice will communicate the network slice identifiers back to the NF. The NF will determine network-slice-adjusted priorities for messages associated with different network slices and use the network-slice-adjusted priorities to govern message handling during overload and congestion conditions.

Figure 3:
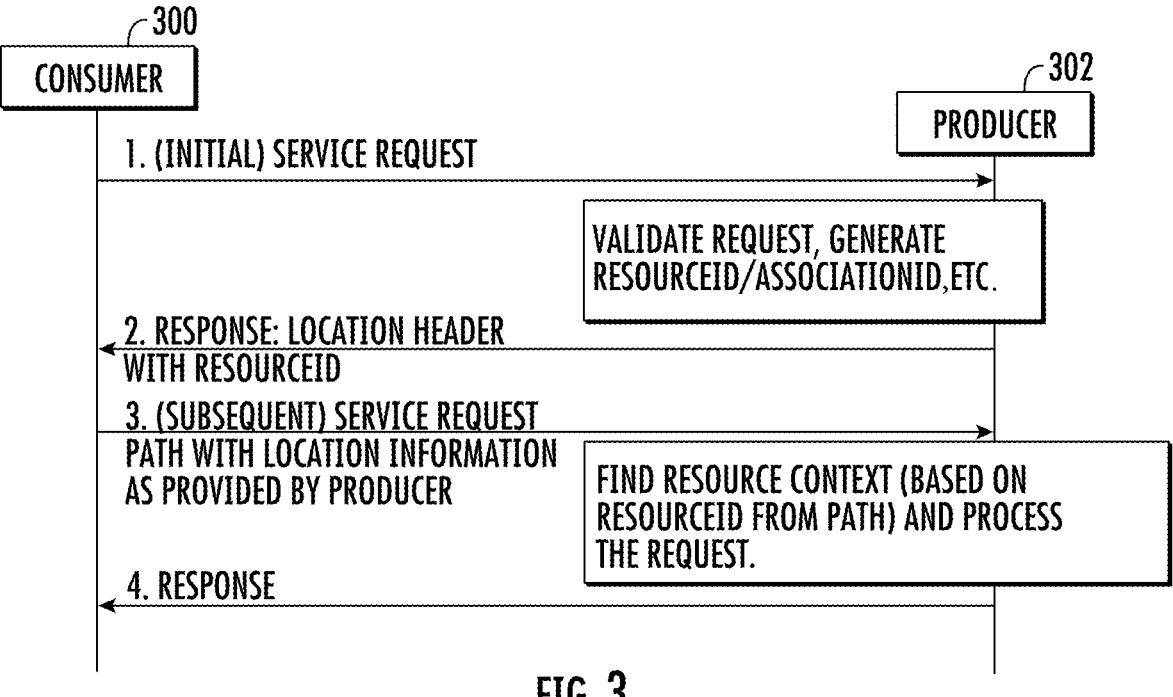
FIG. 3 is a message flow diagram illustrating exemplary messages exchanged for an initial and a subsequent service request.

FIG. 3 is a message flow diagram illustrating exemplary messages exchanged for an initial and a subsequent service request Referring to the message flow in FIG. 3, in line 1, consumer NF 300 sends an initial service request to a producer NF 302. The initial service request may be a service-based interface (SBI) request and may include a network slice identifier. Producer NF 302 receives the request, validates the request, and generates a resource or association Id, which identifies the resource created on producer NF 302 in response to the service request. In line 2, producer NF 302 sends a service response including a location header with the resource or association Id in the location header.

In line 3, consumer NF 300 sends a subsequent request relating to the same resource or association Id to producer NF 302. Producer NF 302 receives the subsequent request, finds the resource context using the resource or association Id, and processes the request. In line 4, producer NF 302 sends a response to consumer NF 300.

For interfaces requiring network slice support, network slice information is mandatory in initial service requests. For example, the SmPolicyContextData data-structure (from 3GPP TS 29.512) for the N7 interface to create SM context at the PCF mandates sliceInfo (SNSSAI type). As will be described in more detail below, the network slice identification information can be leveraged by the PCF (and any other such producer NFs) for identifying network slices and calculating network-slice-adjusted priority values used to control message handling during congestion or overload conditions.

Network slice information may be optional or not allowed in subsequent messages, such as UPDATE (PUT/PATCH/POST) or DELETE requests. Refer to "SmPolicyUpdateContextData" and "SmPolicyDeleteData" from 3GPP TS 29.512 for the N7 interface. The following are possible choices to identify slice information for subsequent requests:

1. The producer can read the local context information upon receiving a subsequent request. This model is not recommended because the operator of the producer NF may wish to reject the message upon receipt without running much processing logic e.g., reading context data from the producer NF's context database.

2. The producer NF can modify the association or resource Id that identifies the resource to include network slice identification information that will be mirrored in subsequent requests. The producer NF may assign a unique and persistent uuid/number for S-NSSAI information. For example, the producer NF may assign the Id 8 to represent slice "255-19CDE0" and add the unique UUID/number to the Association Id/Resource Id, i.e., <associationId>-<uuid/number> e.g. abcedfg-8. Upon receiving a subsequent request relating to an existing resource Id, the producer NF may parse the resourceId to know the unique slice information of service request.

Figure 4:
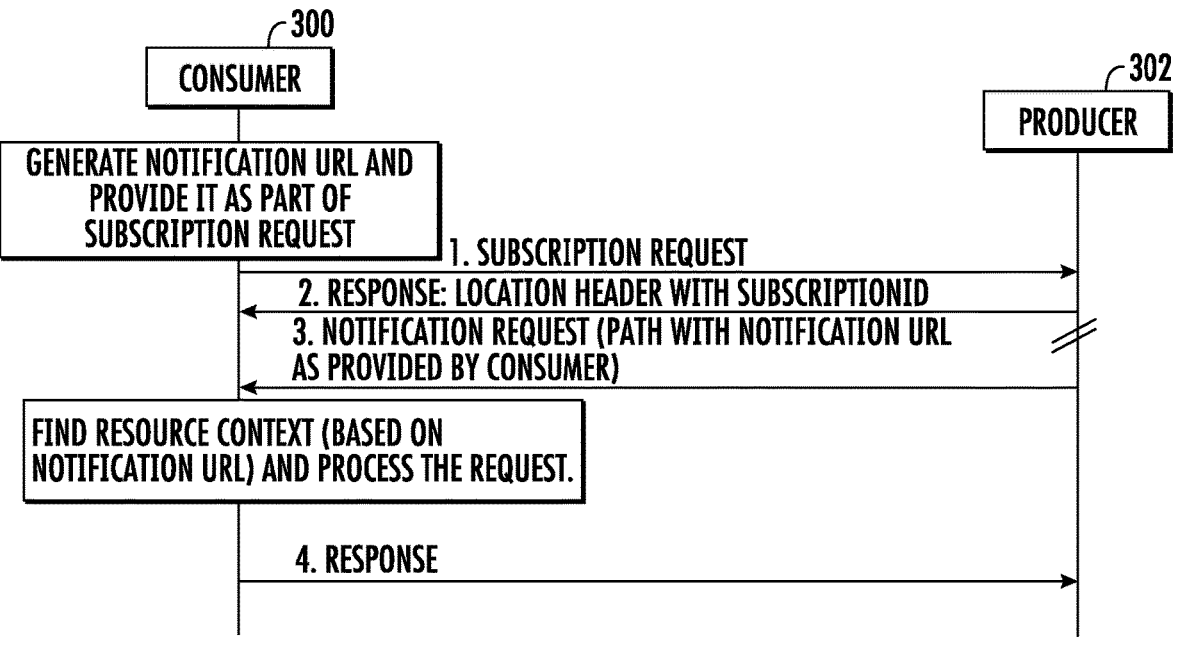
FIG. 4 is a message flow diagram illustrating exemplary messages exchanged for a notification request.

It may also be desirable for consumer NFs to process notification request messages with network-slice-adjusted priorities. FIG. 4 is a message flow diagram illustrating exemplary messages exchanged for a subscription and subsequent notification. In FIG. 4, in line 1, consumer NF 300 sends a subscription request to producer NF 302. Producer NF 302 creates the subscription and, in line 2, returns a subscription ID in the location header of the subscription response message.

When an event matching subscription data associated the subscription occurs, producer NF 302 sends a notification request to consumer NF 300, as indicated by line 3. The notification request includes a notification URL with a path as provided by the consumer NF in the subscription request.

In line 4, consumer NF 300 sends a response to the notification request to producer NF 302.

As illustrated in FIG. 4, for explicit subscriptions (through subscribe requests) or implicit subscriptions (through service requests, e.g., an SMF providing a notification URL to a PCF as part of an SMCreate request), a consumer NF can generate a notification URL that has slice related information. For example, the SMF can assign a unique and persistent uuid/number for S-NSSAI information, e.g., Id 8 represents slice "255-19CDE0". The SMF adds "8" as part of the notification URL to indicate that notification is for slice 255-19CDE0, e.g., https://<fqdn>/path/<sliceId>-<contextId>. Upon receiving the notification request, the SMF can parse the notification URL and adjust notification priority accordingly.

According to an aspect of the subject matter described herein, regardless of slice, a consumer NF may assign priority from a full priority range defined by 3gpp (or based on operator policy), i.e., 0 to 31, based on its local policy for priority assignment. The consumer NF may choose to use subset of priority values for slices. Assigning priorities at the consumer NF from a full range or a subset of the full range may be performed by the consumer NF regardless of the fact that the producer NF has shared or dedicated NE instances. Similar logic can be applied by the producer NF when generating notification requests. At the producer NF, the operator may configure min and max allowed priority values for given service interface and network slice. Table 1 shown below illustrates exemplary network slice priority adjustment rules that can be assigned at the producer NF.

A default rule can also be configured at the producer NF to allow the producer NF to use the priority value provided by the consumer NF "as is" in a message received from a consumer NF. For example, if the interface and network slice parameters in a message do not match any of the network-slice-based priority adjustment rules, the producer NF may use the default value in the network slice and interface-based priority rule to determine the message priority used to determine treatment of the message during overload or congestion conditions.

TABLE 1

Example Priority Adjustment Rules for Producer or Consumer NF to Determine Network-Slice-Adjusted-Priority

| Interface | Slice | Min | Max | Default | Description |
|---|---|---|---|---|---|
| N7 | 11-19CDE0 | 0 | 15 | 8 | For N7 requests with slice 11-19CDE0, default is 8 and range as 0-15. |
| N7 | 15-29CDE1 | 10 | 20 | 14 | For N7 requests with slice 15-29CDE1, default is 14 and range as 10-20. |
| N5 | 11-19CDE0 | 0 | 15 | 8 | For N5 requests with slice 11-19CDE0, default is 8 and range as 0-15. |
| N5 | 15-29CDE1 | 10 | 20 | 14 | For N5 requests with slice 15-29CDE1, default is 14 and range as 10-20. |
| N7 | * | 0 | 31 | 18 | Default rule: Any other slice for N7 has default priority set to 18 with range 0-31. |
| N5 | * | 0 | 31 | 18 | Default rule: Any other slice for N5 has default priority |

TABLE 1-continued

Example Priority Adjustment Rules for Producer or Consumer NF
to Determine Network-Slice-Adjusted-Priority

| Interface | Slice | Min | Max | Default | Description |
|-----------|-------|-----|-----|---------|-------------|
| | | | | | set to 18 with range 0-31. |

During congestion/overload, an NF does the following:
1. The NF uses logic to find slice information from initial/subsequent request or notification request and locates corresponding network slice priority adjustment parameters in the network slice priority adjustment rules database (Table 1).
2. The NF calculates the network-slice-adjusted priority for the message using the information located in the corresponding network slice priority adjustment rules database entry. Consumer or producer NF 300 or 302 may use the following equation to calculate the network slice adjusted priority:

$$A = \text{floor}((R/31*(Mx-Mn)))+Mn, \qquad (1)$$

where:
31 is the max allowed range of priority (as defined by 3GPP standards),
Mx=Max slice priority (as set by the network operator),
R=3gpp-Sbi-Message-Priority as received in the request,
A=Network-slice-adjusted priority value, and
"floor" is the floor function, which returns the closest integer less than or equal to the argument of the function.

Based on the data in Table 1, the network-slice-adjusted priority will be as follows for N7 interface with service request for slice 15-29CDE1.

TABLE 2

Example Network-Slice-Adjusted Priority Value Calculations

| R | Calculation | A |
|---|-------------|---|
| 0 | (0/31*10) + 10 | 10 |
| 10 | (10/31*10) + 10 | 13 |
| 20 | (20/31*10) + 10 | 16 |

Figure 5:
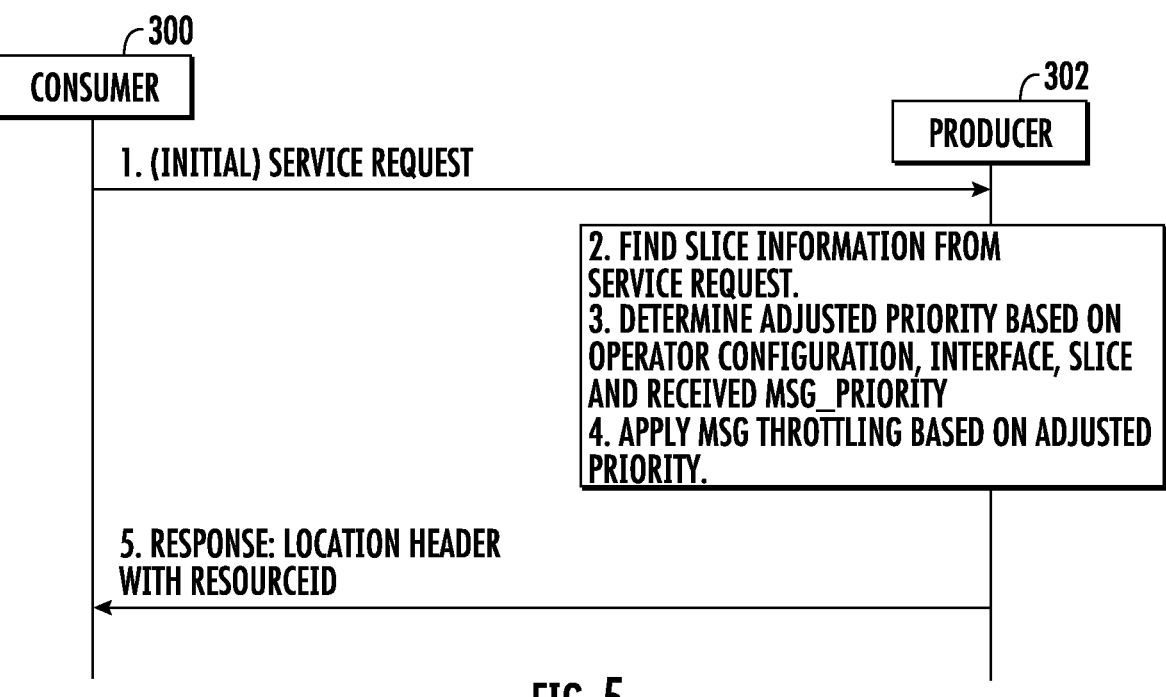
FIG. 5 is a message flow diagram illustrating exemplary messages exchanged in which a producer NF determines a network-slice-adjusted priority for an initial service request and performs message throttling based on the adjusted priority.

FIG. 5 is a message flow diagram illustrating exemplary messages exchanged in which a producer NF determines a network-slice-adjusted priority for an initial service request and performs message throttling based on the adjusted priority. Referring to FIG. 5, in step 1, consumer NF 300 generates a notification URL at which consumer NF 300 desires to be notified, adds the notification URL to an initial service request message, and sends the service request message to producer NF 302. In step 2, producer NF 302 receives the initial service request message and locates network slice information for the initial service request message. Because the service request message is an initial service request message, the message may include an SmPolicyContextData data structure (or other similar data structure depending on the message type), which includes a sliceInfo attribute which contains an Snssai data type. The Snssai data type contains a value that identifies the single network slice assistance information (S-NSSAI), which is a unique identifier for a network slice. Producer NF 200 uses the value of the Snssai data type to perform a lookup in the network slice priority adjustment rules database to determine the minimum and maximum adjusted priority values for the network slice and interface.

In step 3, producer NF 302 calculates the network-slice-adjusted priority value for the message using Equation 1 above, the data from the network slice adjustment rules database, and the 3gpp-Sbi-Message-Priority.

In step 4, producer NF 302 applies message throttling to the message based on the network-slice-adjusted priority value. For example, producer NF 302 may discard or process the message depending on whether the network-slice-adjusted priority value is above or below a priority discard threshold defined for the congestion or overload level of producer NF 302. In step 5, producer NF 302 sends a response message to consumer NF 300.

Figure 6:
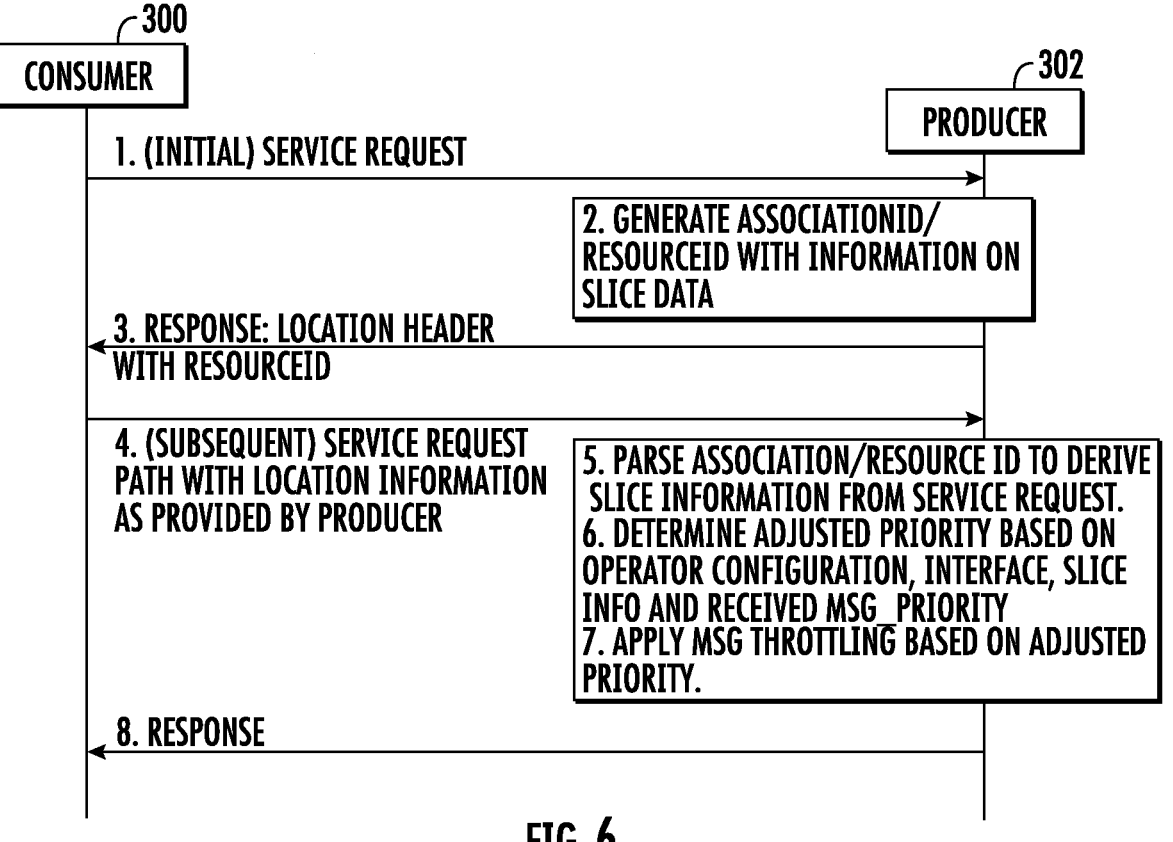
FIG. 6 is a message flow diagram illustrating exemplary messages exchanged in which a producer NF determines a network-slice-adjusted priority for a subsequent service request and performs message throttling based on the adjusted priority.

FIG. 6 is a message flow diagram illustrating exemplary messages exchanged in which a producer NF determines a network-slice-adjusted priority for a subsequent service request and performs message throttling based on the adjusted priority. Referring to FIG. 6, in step 1, consumer NF 300 generates an initial service request message, and sends the service request message to producer NF 302. In step 2, producer NF 302 receives the initial service request message and generates an association Id or a resource Id that is mapped to network slice information. For example, producer NF 302 may extract the network slice identifier from the message and include the network slice identifier or a value that is mapped to the network slice identifier in the association ID or resource ID, which will be returned to consumer NF 300 in the response message, and which the consumer NF will use in subsequent messages to access the resource on producer NF 302. In step 3, producer NF 302 generates and sends a response message to consumer NF 300. The response message includes the resource Id or association Id modified to include the value that is mapped to the network slice information.

In step 4, consumer NF 300 sends a subsequent request to producer NF 302. The subsequent request includes the resource identifier from step 3.

In step 5, producer NF 302 parses the association Id or resource Id to obtain the network slice identifier and uses the network slice identifier to perform a lookup in the network slice priority adjustment rules database.

In step 6, producer NF 302 calculates the network-slice-adjusted priority value for the message using Equation 1 above, the data from the network slice priority adjustment rules database, and the 3gpp-Sbi-Message-Priority. In cases where the 3gpp-Sbi-Message-Priority is missing in a service request, the default priority for the corresponding interface and network slice priority adjustment rule will be used for message processing during overload/congestion.

In step 7, producer NF 302 applies message throttling to the message based on the network-slice-adjusted priority value. For example, producer NF 302 may discard or process the message depending on whether the network-slice-adjusted priority value is above or below a priority discard threshold defined for the congestion or overload level of producer NF 302. In step 8, producer NF 302 sends a response message to consumer NF 300.

Figure 7:
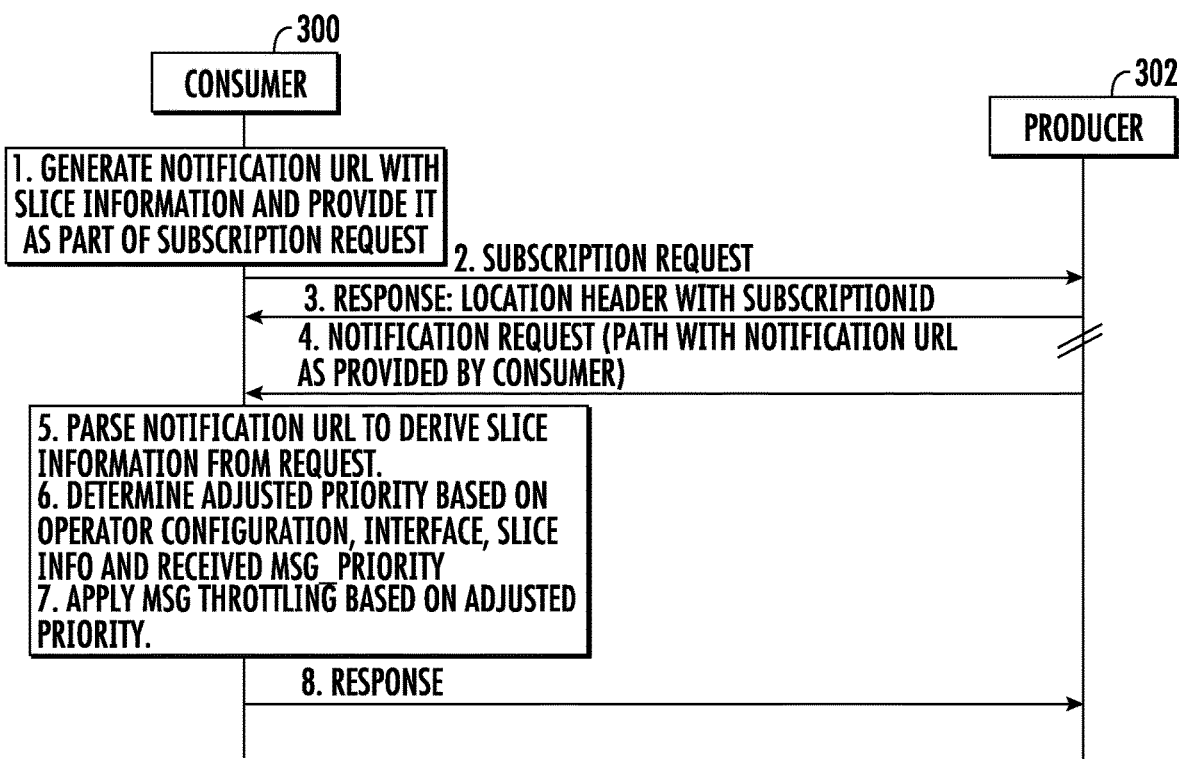
FIG. 7 is a message flow diagram illustrating exemplary messages exchanged in which a consumer NF determines a network-slice-adjusted priority for a notification request and performs message throttling for the notification request based on the adjusted priority.

FIG. 7 is a message flow diagram illustrating exemplary messages exchanged in which a consumer NF determines a network-slice-adjusted priority for a notification request and performs message throttling for the notification request based on the adjusted priority. Referring to FIG. 7, in step 1, consumer NF 300 generates a notification URL that includes network slice information and generates a subscription request message that includes the notification URL. In step 2, consumer NF 300 sends the subscription request to producer NF 302.

Producer NF 302 receives the subscription request and creates the subscription. In step 3, producer NF 302 sends a subscription response to consumer NF 300. The subscription response includes a location header that includes the subscription identifier, which uniquely identifies the subscription.

In step 4, producer NF 302 detects an event that satisfies subscription data associated with the subscription and sends a notification request to consumer NF 300. The notification request includes a path notification URL created by consumer NF 300 in step 1 that includes the network slice information.

In step 5, consumer NF 300 receives the notification request message, parses the path notification URL to obtain the network slice identifier or value that is mapped to the network slice identifier, and uses the network slice identifier to perform a lookup in the network slice priority adjustment rules database.

In step 6, consumer NF 300 calculates the network-slice-adjusted priority value for the message using Equation 1 above, the data from the network slice adjustment rules database, and the 3gpp-Sbi-Message-Priority. In cases where the 3gpp-Sbi-Message-Priority is missing in notification requests, the default priority for the corresponding interface and network slice priority adjustment rule will be used for message processing during overload/congestion.

In step 7, consumer NF 300 applies message throttling to the message based on the network-slice-adjusted priority value. For example, consumer NF 300 may discard or process the message depending on whether the network-slice-adjusted priority value is above or below a priority discard threshold defined for the congestion or overload level of consumer NF 300. In step 8, consumer NF 300 sends a response message to producer NF 302.

Figure 8:
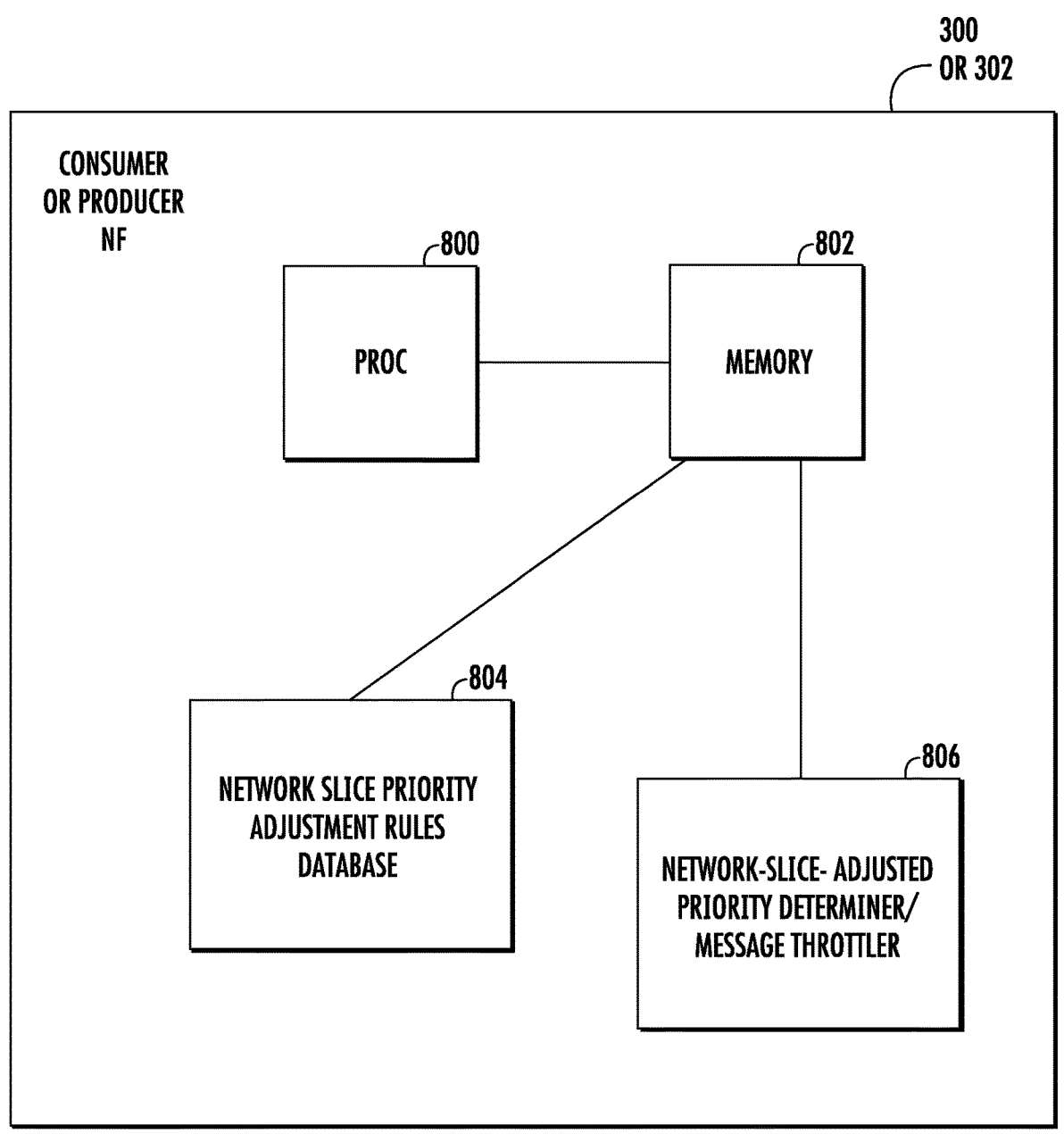
FIG. 8 is a block diagram illustrating an exemplary architecture of an NF for determining and using network-slice-adjusted priority to throttle message traffic during congestion or overload events.

FIG. 8 is a block diagram illustrating an exemplary architecture of an NF for determining and using network-slice-adjusted priority to throttle message traffic during congestion or overload events. Referring to FIG. 8, consumer or producer NF 300 or 302 includes at least one processor 800 and memory 802. Consumer or producer NF 300 or 302 may also include a network slice priority adjustment rules database 804 that includes data similar to that described above with regard to Table 1 that is usable to calculate network-slice-adjusted priorities for received messages. Network slice priority adjustment rules database 804 may be stored in memory 802 and accessible by programs executed by processor 800. Consumer or producer NF 300 or 302 may include a network-slice-adjusted priority determiner/message throttler 806 for performing the steps described herein for determining network-slice-adjusted priorities for received messages and using the network-slice-adjusted priorities to throttle the messages during overload or congestion conditions of consumer or producer NF 300 or 302. a network-slice-adjusted priority determiner/message throttler 806 may be implemented using computer executable instructions stored in memory 802 and executed by processor 800.

Figure 9:
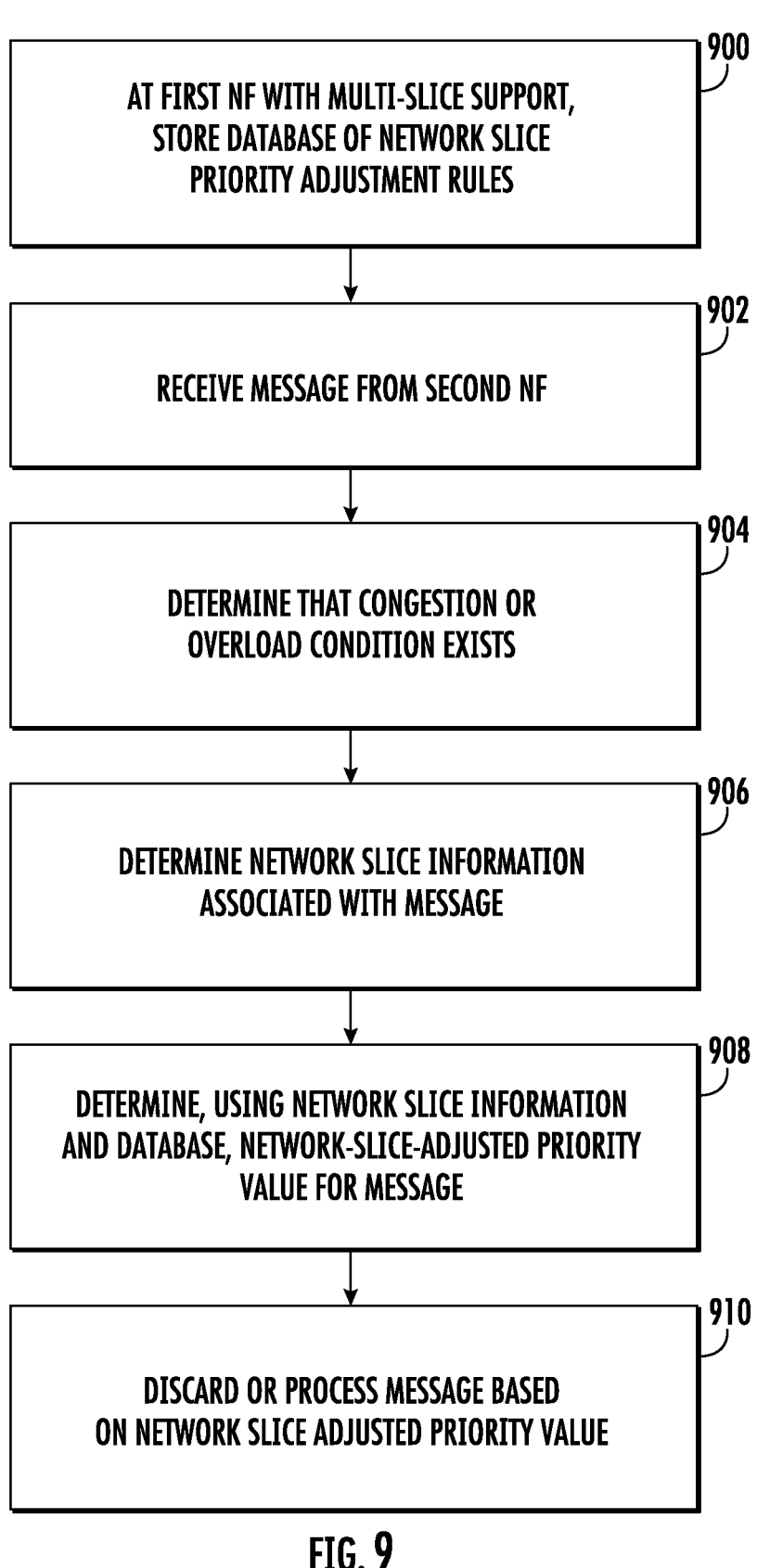
FIG. 9 is a flow chart illustrating an exemplary process for determining and using a network-slice-adjusted priority.

FIG. 9 is a flow chart illustrating an exemplary process for determining and using a network-slice-adjusted priority. Referring to FIG. 9, in step 900, the process includes, at a first NF that supports multiple network slices, storing a database of network-slice-based priority adjustment rules specifying network-slice-based priority adjustment parameters. For example consumer NF or producer NF 300 or 302 may be configured with network slice priority adjustment rules database 804 that contains parameters for adjusting priorities of messages based on interfaces and network slices. One example of such parameters includes different minimum and maximum or ranges of network-slice-adjusted priority values for each network slice/interface combination, as illustrated in Table 1 above.

In step 902, the process includes receiving a message from a second NF. For example, if the receiving NF is producer NF 302, the message may be an initial request or a subsequent request from consumer NF 300. If the receiving NF is consumer NF 300, the message may be a notification request from producer NF 302.

In step 904, the process includes determining that a congestion or overload condition exists. For example, consumer or producer NF 300 or 302 may determine that its available processing capacity has fallen below an operator-defined threshold.

In step 906, the process includes determining network slice information associated with the message. For example, if the message is an initial request, producer NF 302 may read the S-NSSAI from the message. If the message is a subsequent request, producer NF 302 may parse the association Id or resource Id in the message to obtain a value previously inserted in the association id or resource Id by producer NF 302 that is mapped to the S-NSSAI. If the message is a notification request, consumer NF 300 may parse the notification URL to obtain a value previously inserted in the notification URL by consumer NF 300 that is mapped to the S-NSSAI.

In step 908, the process includes determining, using the network slice information and the database of network-slice-based priority adjustment rules, a network-slice-adjusted priority value for the message. For example, consumer or producer NF 300 or 302 may use Equation 1 and the parameters obtained from the network slice priority adjustment rules database to determine a network-slice-adjusted priority for the message.

In step 910, the process includes discarding or processing the message based on the network-slice-adjusted priority value for the message. For example, consumer or producer NF 300 or 302 may determine whether the network-slice-adjusted priority value for the message is above an operator-defined discard threshold for the current congestion or overload level of consumer or producer NF 300 and 302 and, in response, discard the message. If the network-slice-adjusted priority value for the message does not exceed the discard threshold for the current congestion or overload level, consumer or producer NF 300 or 302 may process the message. For example, if the message is an initial request, producer NF 302 may create the corresponding resource and send a response with the resource Id to producer NF 302. If the message is a subsequent request, producer NF 302 may access or update the record corresponding to the resource (depending on the type of request) and send a response to consumer NF 300. If the message is a notification request, consumer NF 300 may update its subscription data associated with the subscribed-to resource.

If the network operator changes the minimum and maximum priority values for an existing network slice priority adjustment rule or adds/deletes a specific rule at runtime, the producer or consumer NF will adapt to the new rules automatically when calculating the network-slice-adjusted priority during message processing.

The subject matter described herein addresses priority evaluation on NFs (handling multiples slices) when the NFs are in an overloaded or congested condition. If an initial service request does not support slice information, then the subject matter described herein is not applicable. For example, for requests on the N15 interface which do not include network slice information, the received priority can be used as is for message handling procedure during over- load conditions.

Exemplary advantages or features of the subject matter described herein include that the solution allows consumer NFs to use their local policies to assign the priority values for service requests for different slices. Producer NFs use the logic described herein to bring the assigned priority into common ranges before applying throttling logic during overload conditions. The subject matter described herein can be enabled independently at the producer NF, without any differential behavior from consumer NF (or vice-versa). Since feature is configuration based, the network operator can choose to apply the feature for selective interface and slice priority adjustment at the producer NF.

The disclosure of each of the following references is hereby incorporated herein by reference in its entirety.

REFERENCES 1. 3$^{rd}$ Generation Partnership Project; Technical Specifica- tion Group Core Network and Terminals; 5G System; Network Function Repository Services; Stage 3 (Release 17) 3GPP TS 29.510 V17.6.0 (2022-06)'
2. 3$^{rd}$ Generation Partnership Project; Technical Specifica- tion Group Core Network and Terminals; 5G System Session Management Policy Control Service; Stage 3; (Release 17) 3GPP TS 29.512 V17.7.0 (2022-06)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for adjusting and using priorities of messages at a network function (NF) with multiple network slice support, the method comprising:

at a first NF that supports multiple network slices:

storing a database of rules specifying network-slice- based priority adjustment parameters;

receiving a message from a second NF;

determining that a congestion or overload condition exists, and, in response:

determining network slice information associated with the message;

determining, using the network slice information and the database of network-slice-based priority adjustment rules, a network-slice-adjusted priority value for the message, wherein determining the network-slice-ad- justed priority includes calculating an adjusted priority value using an equation that includes as a parameter a 3gpp-Sbi-Message-Priority value carried in the mes- sage or using a default priority value specified in an interface and network slice-based priority rule in the database when the 3gpp-Sbi-Message-Priority value is not present in the message, wherein the equation includes as parameters minimum and maximum net- work-slice-adjusted priority values configured for a network slice associated with the message, and wherein the equation comprises $$A=\text{floor}((R/31*(Mx-Mn)))+Mn,$$

where A is the network-slice-adjusted priority value, R is the 3gpp-Sbi-Message-Priority value in the message, Mx is the maximum network-slice-adjusted priority value defined for the network slice, and Mn is the minimum network-slice-adjusted priority value defined for the network slice; and discarding or processing the message based on the network-slice-adjusted priority for the message.

2. The method of claim 1 wherein storing the database of network-slice-based message priority adjustment rules includes storing, on a per-interface basis, rules that specify ranges of network-slice-adjusted priority values for the network slices.

3. The method of claim 2 wherein storing the rules on a per-interface basis includes storing a first rule specifying a first range of network-slice-adjusted priority values for a first network slice and interface and storing a second rule specifying a second range of network-slice adjusted priority values for a second network slice and the interface, where the first range of network-slice-adjusted priority values is different from the second range of network-slice-adjusted priority values.

4. The method of claim 1 wherein receiving the message includes receiving an initial service request and further comprising:

reading a network slice identifier from the initial service request;

generating a response to the initial service request;

inserting the network slice identifier or a value that is mapped to the network slice identifier in a resource or association identifier;

including the resource or association identifier in a location header of the response; and sending the response to the second NF.

5. The method of claim 1 wherein receiving the message includes receiving a service request associated with an existing resource and wherein determining a network slice associated with the message includes reading a network slice identifier from a resource or association identifier of the service request.

6. The method of claim 1 wherein receiving the message includes receiving a notification request and wherein deter- mining a network slice associated with the message includes reading a network slice identifier from a notification uniform resource locator of the notification request.

7. The method of claim 1 wherein processing or discard- ing the message based on the network-slice-adjusted priority value includes determining that the network-slice-adjusted priority value is greater than a threshold, and, in response to determining that the network-slice-adjusted priority value is greater than the threshold, discarding the message.

8. A system for adjusting and using priorities of messages at a network function (NF) with multiple network slice support, the system comprising:

a first NF that supports multiple network slices, the first NF including at least one processor and a memory;

a network slice priority adjustment rules database embod- ied in the memory for storing rules specifying network- slice-based priority adjustment parameters; and a network-slice-adjusted priority determiner/message throttler implemented by the at least one processor for receiving a message from a second NF, determining that a congestion or overload condition exists, and, in response:

determining network slice information associated with the message;

determining, using the network slice information and the network slice priority adjustment rules database, a network-slice-adjusted priority value for the message, wherein the network-slice-adjusted priority determiner/message throttler is configured determine the network-slice-adjusted priority value by calculating the network-slice-adjusted priority value using an equation that includes as a parameter a 3gpp-Sbi-Message-Priority value carried in the message or using a default priority value specified in an interface and network slice based priority rule in the database when the 3gpp-Sbi-Message-Priority value is not present in the message, wherein the equation includes as parameters minimum and maximum network-slice-adjusted priority values configured for a network slice associated with the message, and wherein the equation comprises $$A = \mathrm{floor}((R/31*(Mx-Mn)))+Mn,$$

where A is the network-slice-adjusted priority value, R is the 3gpp-Sbi-Message-Priority value in the message, Mx is the maximum network-slice-adjusted priority value defined for the network slice, and Mn is the minimum network-slice-adjusted priority value defined for the network slice; and discarding or processing the message based on the network-slice-adjusted priority value for the message.

9. The system of claim 8 wherein the network slice priority adjustment rules database stores, on a per-interface basis, rules that specify ranges of network-slice-adjusted priority values for the network slices, wherein storing the rules on a per-interface basis includes storing a first rule specifying a first range of network-slice-adjusted priority values for a first network slice and interface and storing a second rule specifying a second range of network-slice-adjusted priority values for a second network slice and the interface, where the first range of network-slice-adjusted priority values is different from the second range of network-slice-adjusted priority values.

10. The system of claim 8 wherein the message includes an initial service request and priority wherein the network-slice-adjusted determiner/message throttler is configured to:

read a network slice identifier from the initial service request;

generate a response to the initial service request;

insert the network slice identifier or a value that is mapped to the network slice identifier in a resource or association identifier;

include the resource or association identifier in a location header of the response; and send the response to the second NF.

11. The system of claim 8 wherein the message includes a service request associated with an existing resource and wherein the network-slice-adjusted priority determiner/message throttler is configured to determine a network slice associated with the message by reading a network slice identifier from a resource or association identifier of the service request.

12. The system of claim 8 wherein the message includes a notification request and wherein the network-slice-adjusted priority determiner/message throttler is configured to determine a network slice associated with the message by reading a network slice identifier from a notification uniform resource locator of the notification request.

13. The system of claim 8 wherein network-slice-adjusted priority determiner/message throttler is configured to discard the message in response to determining that the network-slice-adjusted priority value is greater than a threshold.

14. A non-transitory computer readable medium having stored thereon executable instructions that when executed by a processor of a computer control the computer to perform steps comprising:

at a first network function (NF) that supports multiple network slices:

storing a database of rules specifying network-slice-based priority adjustment parameters for network slices;

receiving a message from a second NF;

determining that a congestion or overload condition exists, and, in response:

determining network slice information associated with the message;

determining, using the network slice information and the database of network-slice-based priority adjustment parameters, a network-slice-adjusted priority for the message, wherein determining the network-slice-adjusted priority includes calculating an adjusted priority value using an equation that includes as a parameter a 3gpp-Sbi-Message-Priority value carried in the message or using a default priority value specified in an interface and network slice-based priority rule in the database when the 3gpp-Sbi-Message-Priority value is not present in the message, wherein the equation includes as parameters minimum and maximum network-slice-adjusted priority values configured for a network slice associated with the message, and wherein the equation comprises $$A = \mathrm{floor}((R/31*(Mx-Mn)))+Mn,$$

where A is the network-slice-adjusted priority value, R is the 3gpp-Sbi-Message-Priority value in the message, Mx is the maximum network-slice-adjusted priority value defined for the network slice, and Mn is the minimum network-slice-adjusted priority value defined for the network slice; and discarding or processing the message based on the network-slice-adjusted priority for the message.

* * * * *